United States Patent [19]

Rose

[11] Patent Number: 4,534,226
[45] Date of Patent: Aug. 13, 1985

[54] COUNTER ROTATING, MULTI TURBINE FLOW MEASURING SYSTEM

[75] Inventor: Leonard Rose, Granville, Vt.

[73] Assignee: General Electric Company, Schenectady, N.Y.

[21] Appl. No.: 547,816

[22] Filed: Nov. 1, 1983

[51] Int. Cl.³ .......................... G01F 1/12; G01F 1/90
[52] U.S. Cl. ............................ 73/861.84; 73/861.02
[58] Field of Search .......... 73/861.83, 861.84, 861.02, 73/861.03

[56] References Cited

U.S. PATENT DOCUMENTS

| | | | |
|---|---|---|---|
| 3,635,084 | 1/1972 | Lamphere et al. | 73/861.03 |
| 3,710,622 | 1/1973 | Hammond et al. | 73/861.84 |
| 3,735,637 | 5/1973 | Penet | 73/861.84 |
| 3,776,034 | 12/1973 | Kolb | 73/861.03 |
| 3,934,473 | 1/1976 | Griffo | 73/861.84 |

Primary Examiner—Charles A. Ruehl
Attorney, Agent, or Firm—I. David Blumenfeld

[57] ABSTRACT

A volumetric flow measuring system includes two counter-rotating turbines axially displaced along the flow path. Because the turbines rotate in opposite directions, the net change of the sum of the main and sensor turbine signals due to non-axial or "swirl" components in the flow is zero thus cancelling their effects. In addition, the sensor turbine is operated at a lower speed than the main turbine so that main turbine speed errors due to "slip" (i.e. reduction of turbine speed from theoretical due to restraining torques) are counteracted by an increase in sensor speed. The only error then is the sensor turbine "slip" error which is smaller than the main turbine "slip" error by a factor equal to the ratio of the main and sensor turbine speeds.

6 Claims, 2 Drawing Figures

COUNTER ROTATING, MULTI TURBINE FLOW MEASURING SYSTEM

This invention relates to a flow measuring system, and more particularly to a system for measuring volumetric fluid flow rate.

Single turbine, multi vane volumetric flow-meters in which the rotational velocity of the turbine is proportional to the speed and volume of the fluid stream are well known. In such devices fluid flow straighteners are customarily positioned at the entrance of the flowmeter housing in order to eliminate non-axial flow components that cause fluid velocity measuring errors. However, it is not always possible to eliminate such non-axial flow components completely so that single turbine flow-meters are subject to speed errors due to fluid "swirl". Turbine restraining torques due to bearing friction and fluid drag torques are another source of turbine speed errors in single turbine flowmeters. These sources of turbine speed reduction result in volumetric flow errors since measurement of volumetric flow is directly proportional to measured turbine speed.

Applicant has found that errors due to non-axial or "swirl" components in the flow stream may be virtually eliminated by providing a second "sensor" turbine which rotates in a direction opposite to that of the main or upstream turbine. A non-axial velocity vector component which affects the main turbine speed produces the opposite effect on the sensor turbine speed. As a result, the net change of the sum of the turbine and sensor speed signals is zero (0) and errors due to "swirl" effect are virtually eliminated.

Applicant has also discovered that by operating the downstream sensor turbine at a lower speed than the main turbine, i.e., the turbines have different vane angles so that for any flow rate the main and sensor turbine speeds are maintained at a predetermined ratio, the main turbine "slip" error is eliminated and replaced by a sensor turbine "slip" error which is significantly smaller, i.e., by a factor proportional to the ratio of the main and sensor turbine speeds.

Turbine "slip" is a speed error term due to turbine restraining torques and causes the turbine rotational speed to be less than the theoretical speed which is exactly proportional to volumetric flow rate. This relationship of the theoretical turbine angular velocity to the volumetric flow rate can be described by the following equation:

$$\frac{\omega}{Q} = \frac{\tan \alpha}{A\bar{r}} \quad (1)$$

where:
- $\omega$ = turbine angular velocity
- $Q$ = volumetric flow rate
- $\bar{r}$ = mean vane radius
- $\alpha$ = angle of vane to direction of fluid flow at $\bar{r}$
- $A$ = area of flow stream through the turbine In actual practice, however, some torque is required to drive the turbine to overcome restraining torques on the turbine. The generated driving torque is proportional to the product of mass flow rate and resulting change in fluid velocity $\Delta V$ and is necessary to overcome the turbine restraining torque $\tau_r$. Turbine restraining torque is typically due to bearing friction and certain fluid drag torques which are proportional to the square of the volumetric flow rate and in some cases a function of Reynolds number. The turbine restraining torque is essentially described by the equation:

$$\tau_r = \rho Q \bar{r}^2 \Delta \omega \quad (2)$$

where:
- $\tau_r$ = restraining torque
- $\rho$ = fluid density
- $\Delta \omega$ = change in turbine speed from ideal and $Q$ and $\bar{r}$ are as previously described Rearranging and dividing by $Q$ results in:

$$\frac{\Delta \omega}{Q} = \frac{\tau_r}{\rho \bar{r}^2 Q^2} \quad (3)$$

Expression $W/Q$ for the actual, as opposed to the ideal, flowmeter thus is written in terms of a theoretical term for a perfect flowmeter less the "slip" term due to restraining torques.

$$\frac{\omega}{Q} = \frac{\tan \alpha}{A\bar{r}} - \frac{\Delta \omega}{Q} = \frac{\tan \alpha}{A\bar{r}} - \frac{\tau_r}{\rho Q^2 \bar{r}^2} \quad (4)$$

Because the flowmeter includes a second, lower speed counter-rotating turbine, the main turbine "slip" which produces a change in fluid angular velocity has an opposite effect on the second turbine so that the equation for the operation of the sensor turbine is:

$$\frac{\omega_s}{Q} = \frac{\tan \alpha_s}{A\bar{r}} - \frac{\tau_{rs}}{\bar{r}^2 \rho Q^2} + \frac{\tau_{rt}}{\bar{r}^2 \rho Q^2} \quad (5)$$

Where:
- $\omega_s$ = sensor turbine rotational speed
- $\alpha_s$ = sensor turbine blade angle
- $\tau_{rs}$ = restraining torque on sensor turbine
- $\tau_{rt}$ = restraining torque on main turbine It will be immediately apparent that in summing the main turbine and sensing turbine registration terms $W/Q$, the equation becomes:

$$\frac{\omega_s + \omega_t}{Q} = \frac{\tan \alpha_t + \tan \alpha_s}{A\bar{r}} - \frac{\tau_{rs}}{\bar{r}^2 Q^2} \quad (6)$$

Where the subscripts t and s refer respectively to the main and sensor turbines.

In essence, Applicant has found that by providing a counter-rotating, lower speed sensor turbine, velocity errors due to the "slip" of the main turbine are eliminated in the combined speed equation and only the reduced sensor "slip" remains.

Since the "slip" term is roughly a function of turbine speed and the sensor turbine speed is approximately one-fifth (1/5th) that of the main turbine, the sensor turbine "slip" is also 1/5th of the main turbine "slip". This results in a significantly reduced error and, therefore, higher accuracy and greater linearity.

By using counter-rotating turbines an additional advantage of the invention can be realized by using the ratio of the rotational speeds to sense the relative condition of the bearings supporting these turbines. That is, the speed ratio, ($V_m/V_s$ or $V_s/V_m$) should be constant, absent any additional restraining torques, on one or the other turbine due to bearing problems. Thus, if the main turbine bearing is degrading introducing additional torques, the main turbine speed $V_s$ is reduced, thus changing the speed ratio in one direction indicating the the main turbine bearing is degrading. Similarly, if the bearing of the sensing turbine deteriorates, the speed of the sensing turbine is reduced thus changing the speed ratio in the other direction thereby indicating that the sensing turbine bearings are deteriorating. Thus by sensing the speed ratios, any changes in the ratio and the direction of the change provides an indication of the condition of the bearings.

An output signal proportional to mass flow rate may be readily produced by expanding the flow measuring system and coupling a densitometer to the dual turbine volumetric flowmeter. The output signals from the flowmeter are processed in a suitable network to produce a signal M in which $M = Q\rho$.

In summary, a flow measuring system is described which incorporates a volumetric flowmeter that includes two, counter-rotating, differential speed turbines axially displaced along the fluid flow path. The flowmeter is characterized by the fact that counter rotation of the turbines cancels errors due to non-axial or "swirl" component in the fluid stream. By operating the turbines at different speeds, errors due to "slip" are substantially reduced.

It is, therefore, a principal objective of the instant invention to provide a volumetric flowmeter which intrinsically compensates for errors due to a non-axial flow component.

Another objective of the invention is to provide a flow measuring system which is not subject to errors resulting from non-axial flow components and in which errors due to "slip" are minimized.

Yet another objective of the invention is to provide a volumetric flowmeter which is highly accurate and has a linear relation over a larger dynamic flow range than a standard single element turbine.

Still another objective of the invention is to provide a volumetric flowmeter in which the effects of non-axial or "swirl" components of the flow are cancelled.

A still further objective of the invention is to provide a high accuracy turbine mass flowmeter which combines a density viscosity sensor with a counter-rotating sensor multi-turbine volumetric flow meter arrangement.

Still other objectives and advantages of the invention will become apparent as the description thereof proceeds.

The various objectives and advantages of the instant invention are realized in a turbine flowmeter which includes a pair of turbines with the downstream counter rotating sensing turbine operating at a lower speed than the main turbine. Any errors due to non-axial or "swirl" flow components on the main turbine are cancelled by the opposite effect "swirl" has on the counter-rotating sensor turbine. Errors due to main turbine "slip" are reduced by a factor equivalent to the speed ratio between the main and sensor turbines.

The vanes on the main turbine and sensor turbines are positioned at different angles with respect to the turbine and flow axes. Consequently, the impinging flow causes the turbines to rotate at different but fixedly related rotational speeds for all flow rates.

The novel features which are believed to be characteristic of this invention are set forth with particularity in the appended claims. The invention itself, however, together with further objectives and advantages thereof, may best be understood by reference to the following description taken in connection with the accompanying drawings in which:

Figure 1:
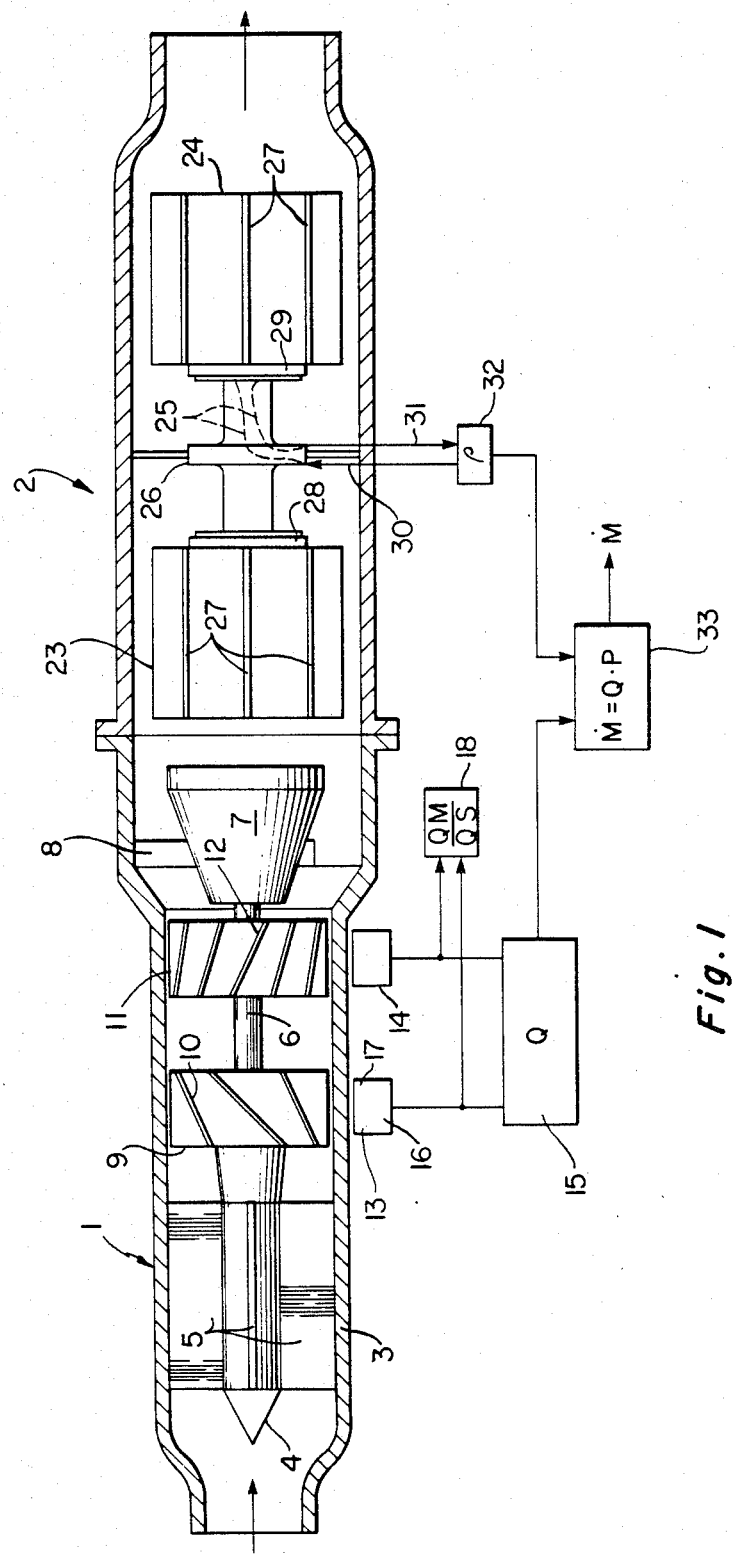
FIG. 1 is a schematic view of a volumetric flowmeter and densitometer combination along with signal conditioning and processing networks producing volumetric and mass flow information.

FIG. 1 schematically illustrates the flow measuring system and shows the novel counter-rotating dual turbine flowmeter structure, the associated densitometer, and the signal processing networks to produce accurate volumetric and mass flow information.

The flow measuring assembly includes a volumetric flowmeter 1 and a densitometer 2 coupled directly to the output of the flowmeter. Flowmeter 1 consists of a housing 3, of a non-magnetic material such as stainless steel, having an inlet through which a fluid or liquid stream is introduced. Positioned adjacent to the inlet is a cone-shaped hub 4 which supports a plurality of flow straightening vanes 5. Vanes 5 are radially disposed around hub 4 and convert rotational or non-axial flow components into axial flow. That is, the vanes straighten the incoming flow to produce axial flow through the housing. However, as pointed out previously, while they are effective to remove most of the angular or "swirl" component, a certain amount of fluid "swirl" may still be present and its effect on the flowmeter turbines must be compensated for.

A shaft 6 is supported at one end by hub 4 and at the other end by a hub element 7 located at the outlet end of the flowmeter housing. Hub 7 is supported in the housing by means of three (3) equally spaced struts 8.

Located adjacent to the straightener assembly is main turbine 9 which is journaled on shaft 6 by suitable bearings, not shown. Main turbine 9 consists of a lightweight annulus and a plurality of helical magnetic vanes 10 disposed around the periphery of the turbine. Vanes 10 are of a helical configuration and preferably have a lead of 1.2 (helical angle approximately or 60° at $\bar{r}$). The axial fluid flow impinges on the vanes causing the turbine to rotate at a speed proportional to the fluid velocity which in turn is proportional to the volumetric flow rate Q of the fluid.

Positioned immediately downstream of the main turbine is a sensor turbine 11 which is constructed to cancel turbine speed errors due to non-axial flow. Sensor turbine 11 is similarly journaled on shaft 6 by suitable bearings. As pointed out previously, sensor turbine 11 is designed to rotate in a direction opposite to that of the main turbine so that a pair of counter-rotating turbines are provided to cancel out effects of any non-axial or "swirl" flow component; i.e., any "swirl" which has not been removed by the flow straightening vanes 5. Sensor turbine 11 also includes plurality of helical magnetic vanes 12 which are, however, of an opposite helical twist, i.e., right handed vs. left handed, so that the fluid causes the sensor turbine 11 to rotate in an opposite direction from that of the main turbine.

The angle of the helical vanes on sensor turbine 11 is less than that of the main turbine so that the sensor turbine, at any given fluid flow rate, operates at a speed which is less than the speed of the main turbine but with the speed ratios being constant for different flow rates. This, reduces any speed errors due to "slip" by a factor equal to the ratio of the two turbine speeds.

In one exemplary form, the speed ratios are 5:1 thus resulting in a reduction in the "slip" error term by a factor of 80%. For a five (5) to one (1) speed ratio the lead of the sensor turbine is a helical angle of approximately 20° on.

Positioned along the flow path of the respective turbines are main turbine speed pick-off 13 and sensor turbine speed pick-off 14 which produce signals proportional to the rotational speed of the turbines. These signals are combined in turbine speed summing network 15 to produce an output signal which is an accurate representation of the turbine speed and, hence, of the volumetric flow rate Q.

Each of the speed pick-offs consist of a magnetic core 16 supporting a winding 17. The pick-offs are energized by a 45 khz signal. The passage of each turbine blade through the field of the coil changes the impedance of the pick-off coil. This results in amplitude modulation of the carrier at the vane passing frequency. This frequency is directly proportional to the rotational speed of each of the turbines.

While the invention is described in terms of magnetic turbine vanes and magnetic pick-offs to sense turbine speed, the invention is not limited thereto as non-magnetic vanes and other means for sensing their angular velocity may be used.

The output signals from pick-offs 13 and 14 are also applied to a Speed Ratio Network 18 that provides an indication of the relative turbine bearing condition. Variation in the speed ratio indicates bearing deterioration with the direction of variation indicating which bearing is deteriorating.

Densitometer 2 is positioned at the outlet of the volumetric flowmeter and consists essentially of two fluid couplers 23 and 24 separated by a hollow torsional spring 25. Spring 25 is supported at a nodal point by a spring-support element 26. The couplers consist essentially of a cylindrical hub with a plurality (preferably four (4)) of radial vanes 27. The fluid, the density of which is to be measured, is contained between vanes 27. A driver piezo crystal 28 is associated with coupler 23 and a pick-up piezo crystal 29 is associated with coupler 24. The two couplers vibrate in torsion, (180° out-of-phase—opposite rotation at any instant). The driver and pick-up crystals respectively drive the system into oscillation and produces an electrical signal at the oscillating frequency. The natural frequency of the couplers varies inversely with the coupler moment of inertia and the moment of intertia varies directly with fluid density so that the natural frequency decreases with increasing density and increases with decreasing density.

Driver current and pick-off signal leads 30 and 31 are coupled between densitometer conditioning and drive network 32 and the crystals. The pick-off signals are fed to an amplifier in a closed loop system in network 32 to drive the system to oscillate at a frequency which is representative of the inertia of the couplers and hence of the density of the fluid. The output signal from densitomer conditioning and drive network 32 is in turn fed as one input to a Mass Flow Conditioning network 33, the other input of which is from Volumetric Flow Conditioning network 15. These two signals are combined and processed in network 33 to produce an output signal proportional to mass flow.

The piezo electric transducers associated with the densitometer couplers and the densitometer spring are preferably annular piezo electric crystals which are circumferentially polarized. These piezo electric transducers have a very high impedance and are positioned with their shear interfaces normal to the common axis of the springs and the couplers so as to assume the full torsional shear load between the spring and the fluid couplers without contributing to the spring effect. Because the stiffness of the transducer, i.e. its natural resonant frequency is high compared to that of the torsional spring, the piezo electric transducers act only as a stiff intervening layer without contributing materially to the torsional spring effect.

For further details of piezo electric transducers of this sort as utilized in a vibrating densitometer, reference is hereby made to U.S. Pat. No. 4,275,585, issued June 30, 1981, in the name of Colby Buzzell, assigned to General Electric, the assignee of the present invention, and said patent is hereby specifically incorporated by reference.

Figure 2:
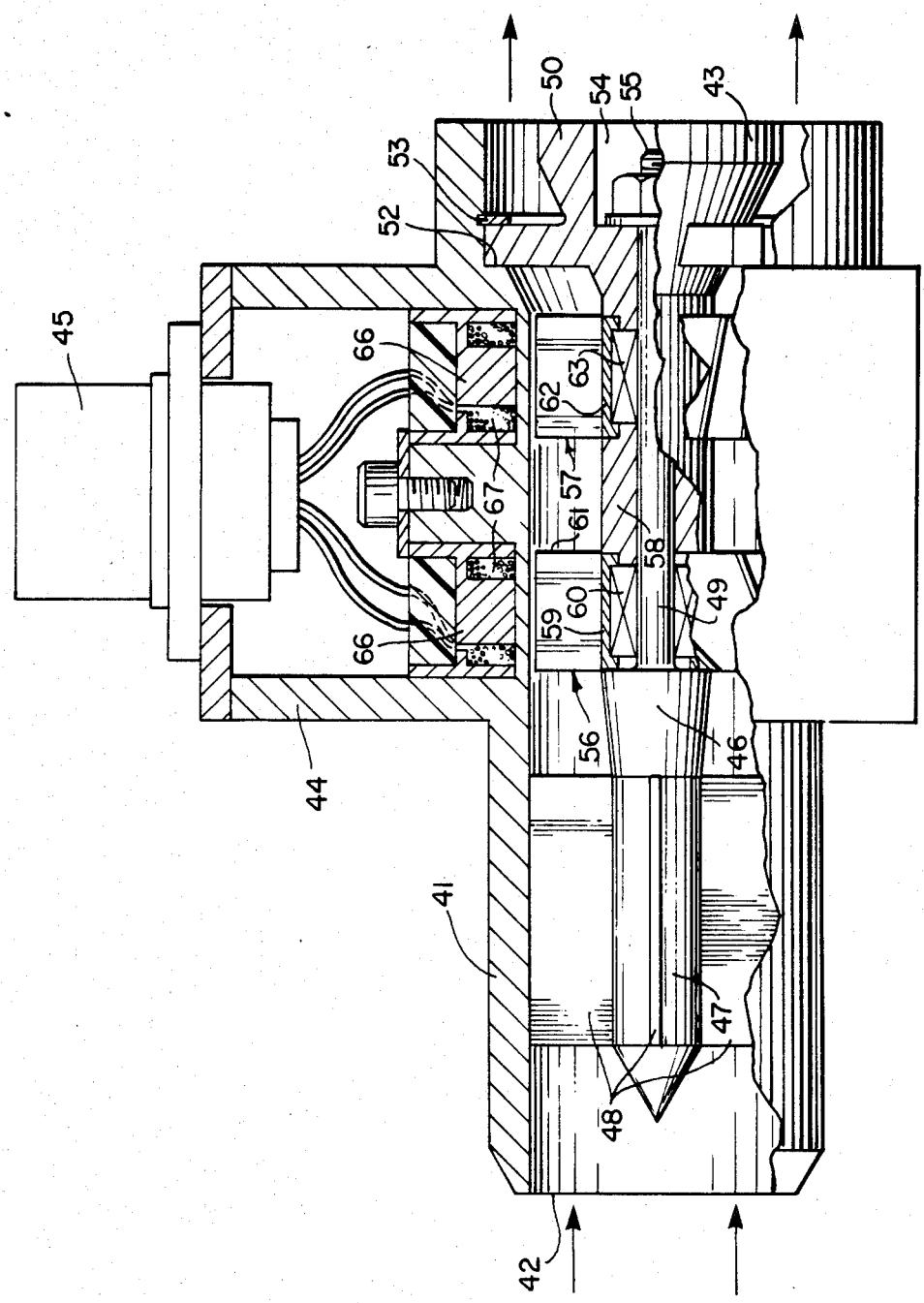
FIG. 2 is a partially broken away view of the dual turbine flowmeter.

FIG. 2 illustrates a partially broken-away section showing structural details of the volumetric flowmeter with the counter-rotating turbines. The volumetric flow measuring device includes a non-magnetic stainless steel housing 41 having an inlet 42 and an outlet 43. The housing includes a main portion as well as a receptacle 44 in which the turbine pick-offs are mounted. An electrical connector 45 to which the leads from pick-off windings are connected is secured at the top of receptacle 44.

Positioned along the housing axis is a shaft 46, one end of which is supported by a flow straightener supporting hub 47 which also supports a plurality of flow straighteners 48. Flow straighteners 48 are radial vanes mounted circumferentially around the hub and force the incoming fluid to flow axially through the housing. Connected to hub 47 is a reduced diameter turbine-supporting shaft portion 49 on which the two counter-rotating turbines are mounted. The downstream end of shaft portion 49 is threaded and extends through hub 50. Hub 50 is supported in the housing by a plurality of struts. The struts are rigidly supported against shoulder 52 on the interior of housing 41 by means of a retaining C-ring 53. The threaded end of shaft 46 extends into recessed portion 54 in hub 50 and is fixedly retained there by means of the nut and washer 55.

Turbines 56 and 57 mounted on shaft portion 46 are separated by a cylindrical spacer 58. Main turbine 56 consists of a thin annulus 59 supported on miniature ball bearings 60, only one of which is shown, and supports a plurality of helical magnetic vanes 61. Sensor turbine 57 is positioned downstream of the main turbine and similarly consists of a thin annulus 62 supported by miniature ball bearings 63, only one of which is shown in FIG. 2. The helical magnetic vanes of sensor turbine 57 have an opposite helical twist from those of the main turbines so that the direction of rotation of sensor turbine 57 is opposite to that of the main turbine, i.e., the two turbines are counter-rotating. Furthermore, the angles of the magnetic vanes of the two turbines are different so that the sensor turbine rotates at a lower speed than the main turbine for any given flow stream velocity. The ratio of these speeds is determined by the angle of the magnetic turbine vanes since the driving torque for the turbines is proportional to the tangent of the vane angle.

Each of the pick-offs mounted in receptacle 44 consists of a magnetic core 66 surrounded by a winding 67. The winding leads are brought out through a plastic encapsulant (such as, 733 Silestic) to an electrical connector 45 mounted at the top of receptacle 44.

As pointed out previously, all of the elements in the flow measuring device such as the housing, the turbine annuli, the supporting hubs, etc. are fabricated of non-magnetic materials such as stainless steel, so that they do not interfere with the interaction between the magnetic turbine vanes and the speed pick-off devices.

It will be seen from the above description that a volumetric flowmeter has been provided which cancels turbine and flow velocity errors due to any non-axial or "swirl" components in the fluid stream. Furthermore, by operating the second or counter-rotating turbine at a lower speed than the main turbine, any rotational or flow error due to "slip" is reduced by a factor proportional to the speed ratios of the two turbines.

While the instant invention has been described in connection with preferred embodiments thereof, the invention is by no means limited thereto, since other modifications of the instrumentalities employed may be made and still fall into the scope of the invention.

It is contemplated by the appended claims to cover any such modifications that fall within the true scope and spirit of this invention.

What we claim is new and desire to secure by Letters Patent of the United States is:

1. A volumetric flow measuring device comprising:
   (a) housing means providing a flow path for a fluid,
   (b) two axially displaced turbine means mounted in said housing and rotating at different but fixedly related speeds proportional to the velocity of the fluid, said turbines rotating in opposite directions whereby any non-axial flow components of said stream has opposite effects on the speed of rotation of said counter-rotating turbines, each of said turbines having a plurality of helical vanes with the helical twist of the vanes on the two turbines being of an opposite sense to cause them to rotate in opposite directions under the impact of said fluid, the helix angle with respect to the flow axis of the vanes of one turbine differing from the helix angle of the vanes on the other turbine whereby the rotational speed of one turbine is different from the rotational speed of the other turbine for any given flow rate,
   (c) means associated with each of said turbines to produce an electrical signal proportional to the rotational speed of the individual turbines,
   (d) means to combine said electrical signals to compensate for effects due to non-axial flow components and produce a signal proportional to the volumetric flow rate.

2. The flow measuring means according to claim 1 including means associated with said volumetric flow measuring means for measuring the density of the fluid, and means for combining the outputs from said volumetric flow and density measuring means to produce a measure of mass flow of the fluid.

3. A volumetric flow measuring device according to claim 1 wherein the downstream turbine rotates at a lower speed than the other turbine for any given flow rate so that rotational speed and flow rate errors due to "slip" from the upstream turbine are reduced by a factor proportional to the ratio of the speeds of said turbines.

4. The volumetric measuring device according to claim 3 wherein the speed ratio of the turbines are at least five to one whereby flow rates errors due to "slip" are reduced by at least 80%.

5. A volumetric measuring device comprising:
   (a) housing means defining a flow path for a fluid stream,
   (b) flow straightening means in said flow path to convert the fluids stream flow to substantially axial flow,
   (c) means for compensating for any non-axial or angular momentum component of said stream exiting from said flow straightening means including a main turbine mounted in the housing and adapted to rotate at a speed proportional to the volumetric flow rate of the fluid stream, said main turbine having a plurality of helical vanes, the helical vanes having a given helix angle with respect to the flow axis,
   (d) a second, counter-rotating sensor turbine mounted downstream from said main turbine, whereby any residual, non-axial angular momentum in said stream affects the speed of said second turbine in a manner opposite to that in which it affects the main turbine, said second turbine having a plurality of helical vanes, the helical twist of the vanes on said second turbine being opposite to those on said main turbine and the helix angle of the vanes on said second turbine with respect to the flow axis differing from that of the vanes of the main turbine whereby the rotational speed of said main turbine and said second turbine differ for any given flow rate,
   (e) pick-off means associated with each of said turbines to produce electrical signals the frequency of which is proportional respectively to the speed of the main and sensor turbines,
   (f) means to combine the output signals from said pick-off means to cancel the effect of angular momentum on the signal representing the speed of the main turbine.

6. The volumetric flow measuing device according to claim 5 wherein said second counter-rotating sensor turbine rotates at a lower speed than the main turbine for any given flow rate, whereby any rotational speed and flow rate errors due to "slip" are reduced by a factor proportional to the ratios of the speeds of said turbines.

* * * * *

UNITED STATES PATENT AND TRADEMARK OFFICE
CERTIFICATE OF CORRECTION

PATENT NO. : 4,534,226
DATED : August 13, 1985
INVENTOR(S) : Leonard Rose

It is certified that error appears in the above-identified patent and that said Letters Patent is hereby corrected as shown below:

In the main body insert in column 1 after line 5 insert the following:

--The invention described herein was made in the performance of work under NASA Contract No. NAS3-22139 and is subject to the provisions of Section 305 of the National Aeronautics and Space Act (72 Stat. 435; 42 U.S.C. 2457) and forwhich invention a Patent Waiver has been granted by NASA --.

Signed and Sealed this

Twenty-fourth Day of February, 1987

Attest:

DONALD J. QUIGG

Attesting Officer     Commissioner of Patents and Trademarks